US012748186B2

(12) United States Patent
Cho et al.

(10) Patent No.: US 12,748,186 B2
(45) Date of Patent: Sep. 29, 2026

(54) APPARATUS AND METHOD FOR MEASURING RPM OF FAN BY USING IR-UWB RADAR

(71) Applicant: IUCF-HYU (INDUSTRY-UNIVERSITY COOPERATION FOUNDATION HANYANG UNIVERSITY), Seoul (KR)

(72) Inventors: Sung Ho Cho, Seoul (KR); Dae Hyeon Yim, Seoul (KR); Seong Kwon Yoon, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 360 days.

(21) Appl. No.: 18/252,733

(22) PCT Filed: Oct. 6, 2021

(86) PCT No.: PCT/KR2021/013699

§ 371 (c)(1),
(2) Date: May 12, 2023

(87) PCT Pub. No.: WO2022/102973

PCT Pub. Date: May 19, 2022

(65) Prior Publication Data

US 2024/0019544 A1 Jan. 18, 2024

(30) Foreign Application Priority Data

Nov. 16, 2020 (KR) ........................ 10-2020-0152615

(51) Int. Cl.
*G01S 7/41* (2006.01)
*F04D 27/00* (2006.01)
(Continued)

(52) U.S. Cl.
CPC ............ *G01S 7/415* (2013.01); *F04D 27/001* (2013.01); *G01S 7/292* (2013.01); *G01S 13/0209* (2013.01)

(58) Field of Classification Search
CPC ...... G01S 7/415; G01S 7/292; G01S 13/0209; F04D 27/001
See application file for complete search history.

(56) References Cited

U.S. PATENT DOCUMENTS 4,885,590 A * 12/1989 Hasan .................. G01S 13/528 342/384
5,646,623 A * 7/1997 Walters .................. G01S 13/32 342/112
(Continued)

FOREIGN PATENT DOCUMENTS

CN 110658519 A 1/2020
JP 2006-330009 A 12/2006
(Continued)

OTHER PUBLICATIONS

Author:Xikun Hu & Tian Jin, Title: Noncontact measurement of rotational movement using IR-UWB radar, Date:2016, Publisher:IEEE , Website (Year: 2016).*
(Continued)

*Primary Examiner* — Jack W Keith
*Assistant Examiner* — Clayton Paul Ridder

(57) ABSTRACT

An apparatus and method are provided for non-contact measurement of fan RPM using an IR-UWB radar. A reflected radar signal is processed to obtain variance values for each position, from which a first position closest to the
(Continued)

radar and a second position furthest from the radar are determined. Fast Fourier transform (FFT) calculations are performed on the reflected signals corresponding to the first and second positions, and the second FFT signal is subtracted from the first FFT signal to determine the RPM of the fan. This approach enables accurate RPM measurement without reliance on lighting conditions or additional markers, providing high reliability across different fan and radar arrangements.

3 Claims, 9 Drawing Sheets

(51) Int. Cl.
*G01S 7/292* (2006.01)
*G01S 13/02* (2006.01)

(56) References Cited

U.S. PATENT DOCUMENTS

| | | | | |
|---|---|---|---|---|
| 2018/0201258 | A1* | 7/2018 | Luo | B60W 40/04 |
| 2020/0355827 | A1* | 11/2020 | Smothermon | G01S 17/88 |

FOREIGN PATENT DOCUMENTS

| | | | |
|---|---|---|---|
| KR | 10-1494778 | B1 | 2/2015 |
| KR | 10-1591163 | B1 | 2/2016 |
| KR | 10-1777000 | B1 | 9/2017 |
| KR | 10-1952552 | B1 | 6/2019 |
| KR | 10-2031121 | B1 | 10/2019 |
| KR | 10-2020-0032916 | A | 3/2020 |
| KR | 10-2150014 | B1 | 9/2020 |

OTHER PUBLICATIONS

Dibyendu Roy et al., "A Novel RF-assisted-Strobe System for Unobtrusive Vibration Detection of Machine Parts" IEEE Sensors Journal, vol. 20, No. 18, Sep. 15, 2020.

Hongming Shen et al., "Respiration and Heartbeat Rates Measurement Based on Autocorrelation Using IR-UWB Radar," in IEEE Transactions on Circuits and Systems II: Express Briefs, vol. 65, No. 10, pp. 1470-1474, Oct. 2018, doi: 10.1109/TCSII.2018.2860015.

Faheem Khan et al., "In-Air Continuous Writing Using UWB Impulse Radar Sensors," in IEEE Access, vol. 8, pp. 99302-99311, 2020, doi: 10.1109/ACCESS.2020.2994281.

* cited by examiner

APPARATUS AND METHOD FOR MEASURING RPM OF FAN BY USING IR-UWB RADAR

TECHNICAL FIELD

The present disclosure relates to an apparatus and a method for measuring RPM of a fan, and more particularly to an apparatus and a method for measuring RPM of a fan by using an IR-UWB radar.

BACKGROUND ART

The RPM, revolutions per minute of a fan, is measured in a variety of ways. Fans are widely used for cooling in industrial facilities, and the RPM of the fan is measured to determine whether the fan is operating properly.

The RPM measurement methods are divided into a contact type and a non-contact type, and in recent years, a method for measuring RPM in a non-contact type is required. Existing non-contact RPM measurement methods include an infrared light method, a stroboscope method, and a proximity probe method.

In the infrared light measurement method, a reflector that can reflect infrared rays is attached to the surface of a rotating mechanical element, and the RPM is measured through the reflected light.

The stroboscope measurement method uses the principle that when illuminating a rotating body with light that flickers periodically, when the flickering cycle and the rotating body's movement cycle are the same, the rotating body appears to be visually stationary.

In the proximity probe measurement method, a probe is installed on the Key_phasor part of the rotating body. While the rotating body is rotating, a pulse is generated at the moment the probe and the Key_phasor coincide, and RPM is measured using the principle of 'Eddy Current'.

Conventional non-contact RPM measurement technologies generally do not have high precision, have limitations on the distance at which an optical signal can be transmitted and received, and cannot be used depending on the intensity of illumination. In addition, there was a problem in that, in order to measure using electromagnetic characteristics, initial installation was required in the measurement target.

DISCLOSURE

Technical Problem

An object of the present disclosure is to propose a non-contact RPM measurement method that is not influenced by external environments such as an illumination intensity and does not require a separate additional installation.

Another object of the present disclosure is to propose a method for measuring RPM in a non-contact manner with high accuracy by using an IR-UWB radar.

Technical Solution

According to an aspect of the present disclosure, conceived to achieve the objectives above, an apparatus for measuring RPM of a fan by using an IR-UWB radar is provided, the apparatus comprising: a radar signal variance acquisition unit which receives a reflected signal of the IR-UWB radar to acquire a variance of a signal at each position; a fan position acquisition unit for acquiring a first position and a second position, associated with the position of the fan, by using the variance of the signal for each position; an FFT calculation unit which performs FFT calculation for the signal of the first position to acquire a first FFT signal and which performs FFT calculation for the signal of the second position to acquire a second FFT signal; a subtraction unit for subtracting the second FFT signal from the first FFT signal; and an RPM acquisition unit for acquiring the RPM of the fan by using the signal subtracted by the subtraction unit.

The fan position acquisition unit sets positions that are equal to or greater than a predetermined boundary value among the variance of signals for each position as candidate positions associated with the position of the fan.

The fan position acquisition unit sets a position closest to the radar among positions equal to or greater than the predetermined boundary value as a first position, and sets a position furthest from the radar as a second position.

The predetermined boundary value is adaptively set for each position and is adaptively set based on noise power around a specific position.

The RPM acquisition unit detects the peak values of the signal subtracted by the subtraction unit and then determines a frequency of a fundamental peak value as the RPM of the fan.

According to another aspect of the present disclosure, conceived to achieve the objectives above, a method for measuring RPM of a fan by using an IR-UWB radar is provided, the method comprising the steps of: (a) receiving a reflected signal of the IR-UWB radar to acquire a variance of a signal at each position; (b) acquiring a first position and a second position, associated with the position of the fan, by using the variance of the signal for each position; (c) performing FFT calculation for the signal of the first position to acquire a first FFT signal, and performing FFT calculation for the signal of the second position to acquire a second FFT signal; (d) subtracting the second FFT signal from the first FFT signal; and (e) acquiring the RPM of the fan by using the signal subtracted in the step (d).

Advantageous Effects

The present disclosure has the advantage of being able to measure RPM of a fan by using an IR-UWB radar, with high accuracy without being influenced by external environments such as an illumination intensity and without requiring a separate additional installation.

MODE FOR INVENTION

Figure 1:
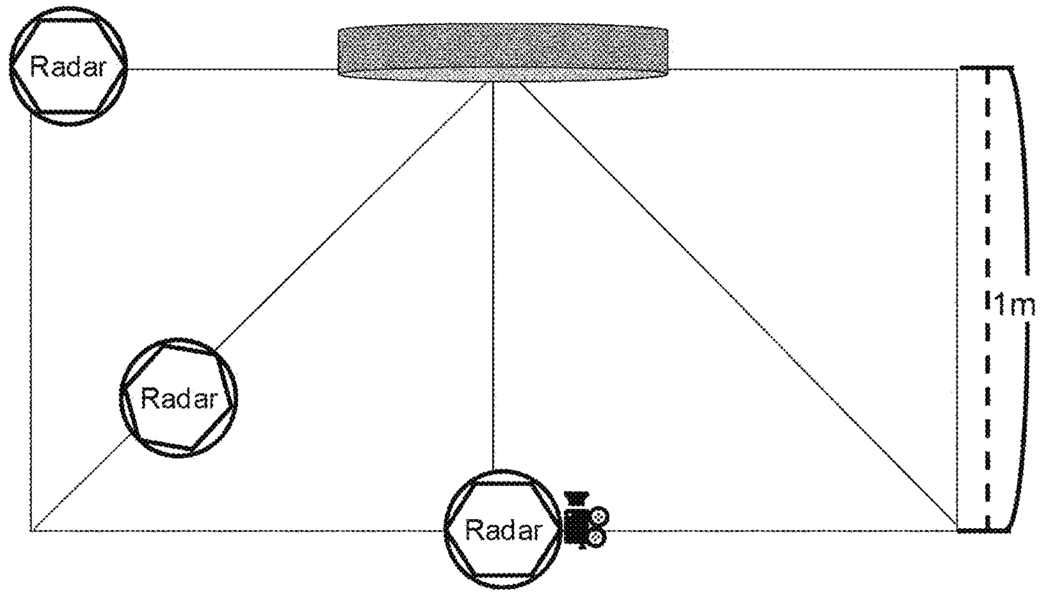
FIG. 1 shows a positional relationship between a fan and a UWB radar for RPM measurement according to an embodiment of the present disclosure.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

FIG. 1 shows a positional relationship between a fan and a UWB radar for RPM measurement according to an embodiment of the present disclosure.

The present disclosure proposes a method for measuring RPM, which is the number of revolutions per minute of a rotating fan, using a UWB radar, which is a non-contact sensor. In the present disclosure, it is assumed that the blades of the fan, which is the target for measuring the number of revolutions, have a predetermined inclined structure. A fan generates wind like a cooler or an electric fan, and a fan that generates wind has a structure inclined at a predetermined angle rather than a flat structure. When the fan rotates, the distance between the blades of the fan and the radar periodically changes due to the inclination structure of the fan, and the present disclosure uses the periodicity of the distance change to measure the RPM of the fan.

The positional relationship between the fan, which is the target for measuring the RPM, and the IR-UWB radar may vary. As shown in FIG. 1, the fan and the IR-UWB radar may be disposed at an angle of 90 degrees, may be disposed at an angle of 45 degrees, and may be disposed at an angle of 0 degrees in the most extreme case.

The present disclosure proposes a method for accurately estimating the RPM regardless of the positional relationship between the fan and the IR-UWB radar.

IR-UWB sensors are widely used for measuring biometric information. For example, it is used to measure biometric information by measuring periodic movements of the human body, such as heart rate and respiratory rate.

However, since there is no empty space in the human body, there is no difficulty in detecting the signal measurement position. However, in the case of a fan, due to its characteristics, even if the position of the fan is detected, the radar signal may penetrate the fan due to the empty space, and therefore, the fan RPM measurement using the IR-UWB sensor has not been attempted. In addition, the inclined structure of the fan blades causes the deflection of the radar signal, which is also the main reason why the IR-UWB radar is not used for RPM measurement.

The present disclosure proposes a method for measuring RPM of a fan by using an IR-UWB sensor that can overcome the variables that may occur depending on the positional relationship between the fan and the IR-UWB radar and the problems that may occur due to transmission and refraction of radar signals.

Figure 2:
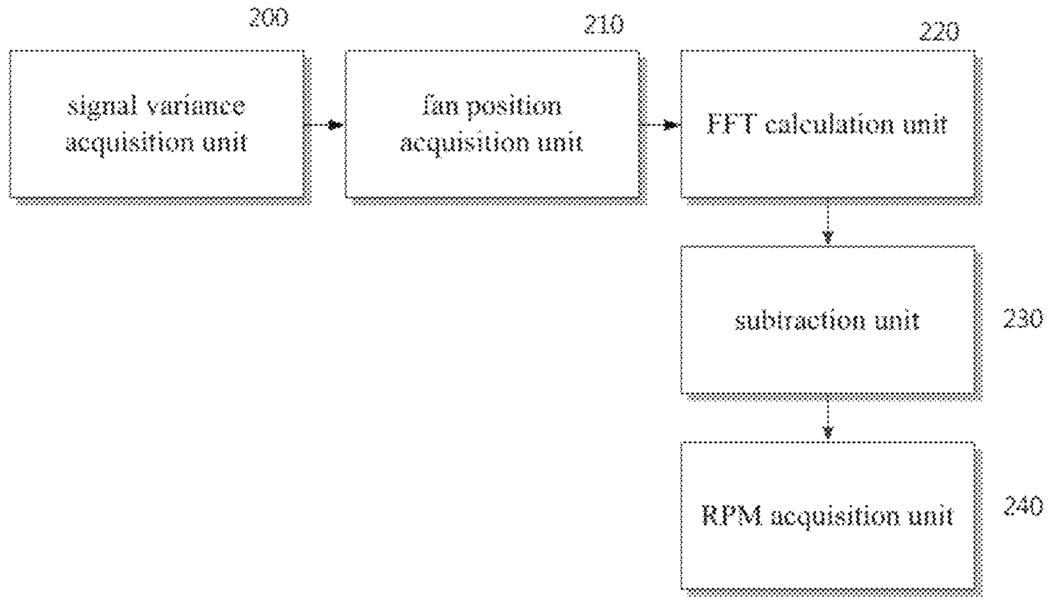
FIG. 2 shows a schematic configuration of an apparatus for measuring RPM of a fan by using an IR-UWB radar according to an embodiment of the present disclosure.

FIG. 2 shows a schematic configuration of an apparatus for measuring RPM of a fan by using an IR-UWB radar according to an embodiment of the present disclosure.

Referring to FIG. 2, the apparatus for measuring RPM of a fan by using an IR-UWB radar includes a radar signal variance acquisition unit 200, a fan position acquisition unit 210, an FFT calculation unit 220, a subtraction unit 230 and an RPM acquisition unit 240.

The radar signal variance acquisition unit 200 is a module that obtains variance information for each position of a signal received after being reflected among signals emitted from an IR-UWB radar. The IR-UWB radar continuously emits radar pulses at preset short time intervals, classifies signals reflected by a specific object among the emitted signals by position, and obtains variance information by position.

If there is a moving object at a specific position, the change in the value of the reflected signal is large at the position, and therefore, it will have a relatively large variance value at the position. However, if there is no moving object at a specific position, the change in the value of the reflected signal will be insignificant at the position, and it will have a relatively small variance value.

The variance signal for each position obtained by the radar signal variance acquisition unit 200 is used as basic information for acquiring the position of the fan in the fan position acquisition unit 210.

The fan position acquisition unit 210 obtains the position of the fan through signal processing of the variance signal for each position of the radar reflection signal. In a general IR-UWB radar system, the distance with the largest variance is determined as the measurement position, but when using this method when detecting the position of a fan, accuracy is lowered.

As described above, this is because the radar signal may pass through an empty space of the fan and may be received by the radar after the signal is refracted due to the inclined structure of the fan blades.

Accordingly, the fan position acquisition unit 210 of the present disclosure detects two positions, and a first position, the closest position among positions having a variance equal to or greater than a predetermined boundary value is selected. As a second position, the farthest position among the positions having a variance equal to or greater than a predetermined boundary value is selected. The first position is likely to be an actual position of a fan, and the second position is likely to be a multipath position caused by refraction or transmission.

Meanwhile, a boundary value for determining a position is adaptively determined for each position. A boundary value at each position is determined based on the noise power around the corresponding position. When the noise power at the corresponding position is defined as $P_n$, the boundary value (T) at the corresponding position is determined by multiplying the noise power by a predetermined constant α as shown in the following equation.

$$T=aP_n \quad \text{[Equation 1]}$$

The noise power at the corresponding position may be defined as an average of noise power around the corresponding position, which is expressed in Equation 2 below.

$$P_n = \frac{1}{N}\sum_{m=1}^{N} x_m \quad \text{[Equation 2]}$$

The fan position acquisition unit 210 sets positions that are equal to or greater than the boundary value adaptively determined as above as fan position candidates. There may be two or more candidate positions of a fan. Among a plurality of candidate positions determined through comparison with the adaptive boundary value, a position closest to the radar is set as the first position, and a position farthest from the radar is set as the second position.

Figure 3:
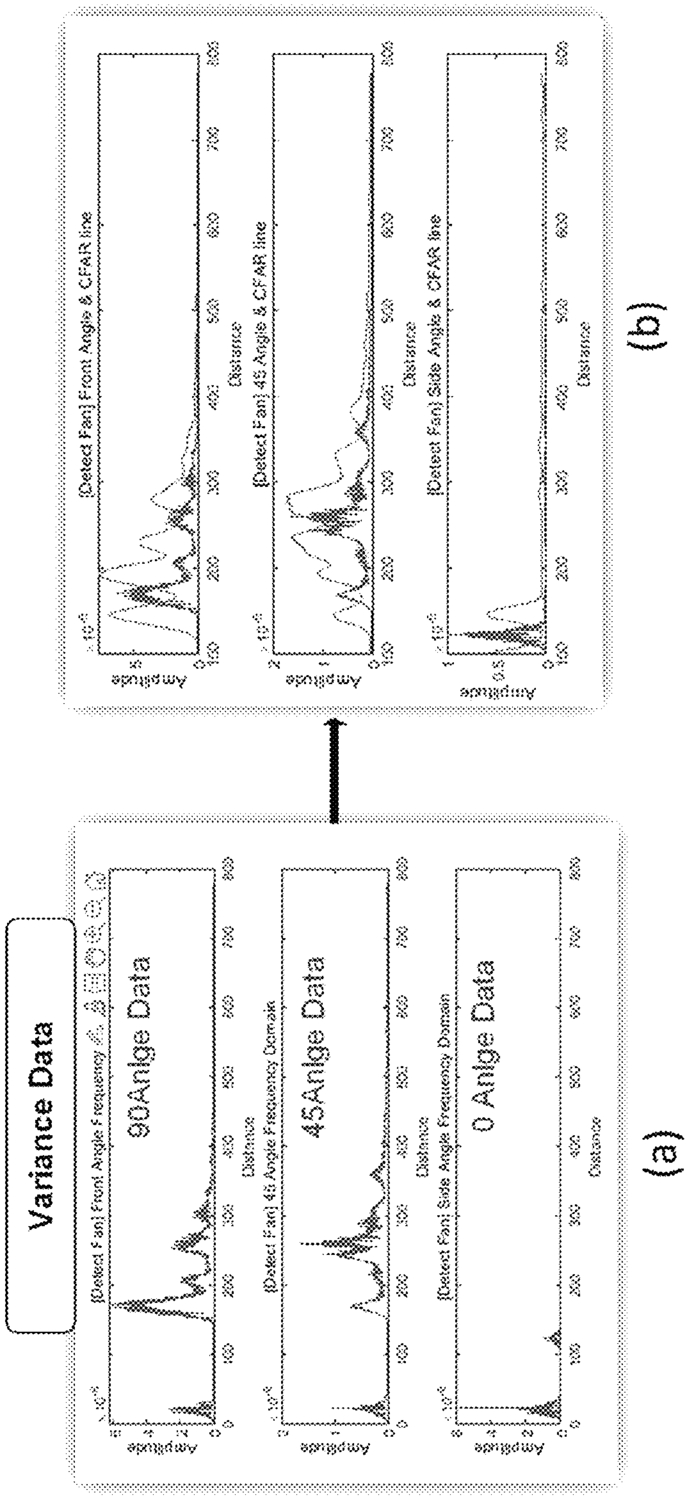
FIG. 3 shows an example of variance data for determining first and second positions of a fan and a signal processing method for position detection from variance data according to an embodiment of the present disclosure.

FIG. 3 shows an example of variance data for determining first and second positions of a fan and a signal processing method for position detection from variance data according to an embodiment of the present disclosure.

Referring to FIG. 3, variance data for each position when the position of the fan and radar is 90 degrees, 45 degrees, and 0 degrees ((a) of FIG. 3) and a boundary value adaptively set for each variance data ((b) of FIG. 3) are shown.

Figure 4:
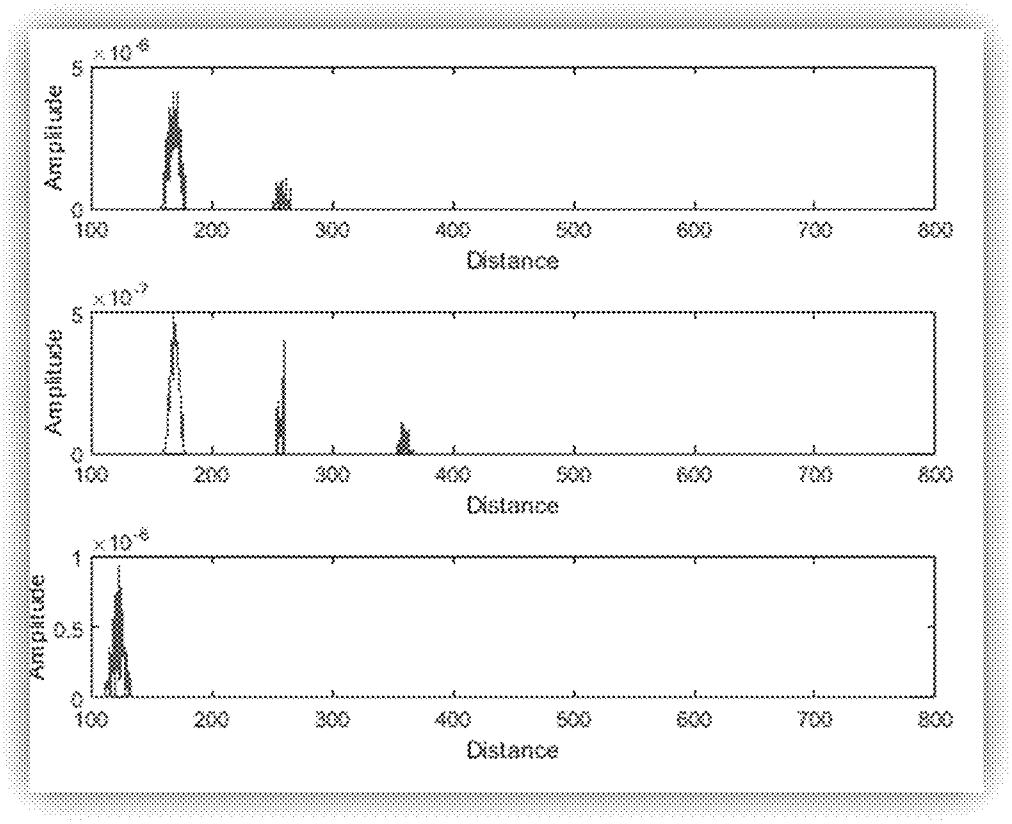
FIG. 4 shows a result of subtracting a boundary value set according to an embodiment of the present disclosure from variance data.

FIG. 4 shows a result of subtracting a boundary value set according to an embodiment of the present disclosure from variance data.

Referring to FIG. 3, when a fan and a radar are disposed in a positional relationship of degrees, a boundary value is adaptively set for each position for a variance signal for each position, and the adaptive boundary value is indicated in orange.

When the fan and the radar have a 90 degree positional relationship, subtracting the adaptive boundary value from the variance data results in a graph as shown at the top of FIG. 4, and it can be seen that two positions that are equal to or greater than the adaptive boundary value are detected. A position closer to the radar among the two positions may be set as the first position, and a position farther from the radar among the two positions may be set as the second position. In the example shown in FIG. 3, when the fan and the radar have a positional relationship of 90 degrees, since there is only one second position, a case in which a plurality of second positions compete does not occur.

Even when the fan and the radar are arranged in a 45 degree positional relationship, the boundary value is adaptively set for each position for a variance signal for each position, and the adaptive boundary value is indicated in orange.

When the fan and the radar have a 45 degree positional relationship, subtracting the adaptive boundary value from the variance data results in a graph as shown in the center of FIG. 4, and it can be seen that three positions that are equal to or greater than the adaptive boundary value are detected. As such, when three candidate positions are detected, a position closest to the radar is set as the first position. Among the remaining two positions, a position furthest from the radar is set as the second position. Eventually, the middle one of the three positions will be dropped.

A case in which only one position is detected when the fan and the radar have a positional relationship of 0 degrees is shown in FIG. 3.

The FFT calculation unit 220 independently performs FFT calculation on a first position signal and a second position signal obtained from the fan position acquisition unit.

The first FFT signal obtained by performing the PPT calculation on the first position signal and the second FFT signal obtained by performing the FFT calculation on the second position signal are calculated. The FFT calculation is a calculation for converting a time domain signal into a frequency domain signal, and since it is a widely known calculation, a detailed description thereof will be omitted.

An FFT signal according to an FFT calculation may have various aspects depending on a measurement environment.

Figure 5:
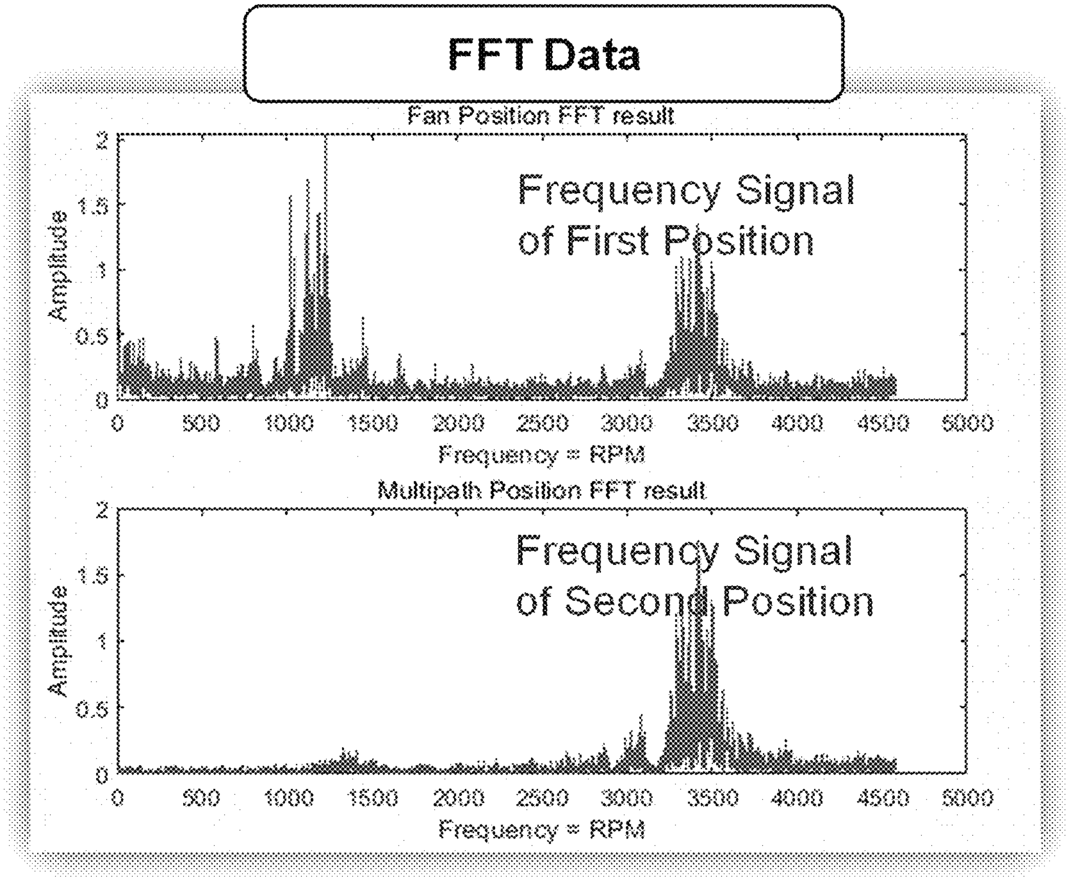
FIG. 5 shows an FFT signal graph for a first position and an FFT signal graph for a second position when a radar and a fan are disposed in a direction of 90 degrees.

FIG. 5 shows an FFT signal graph for a first position and an FFT signal graph for a second position when a radar and a fan are disposed in a direction of 90 degrees.

Referring to FIG. 5, it can be seen that the FFT signal at the first position has a peak in a band of about 1000 to 1200 Hz and a peak in a band of about 3400 to 3600 Hz. The peak of the 3400 to 3600 Hz band can be estimated as a harmonic component, but it cannot be determined only by the signal at the first position.

Referring to FIG. 5, it can be seen that the signal at the second position has a peak in a band of about 3400 to 3600 Hz.

Figure 6:
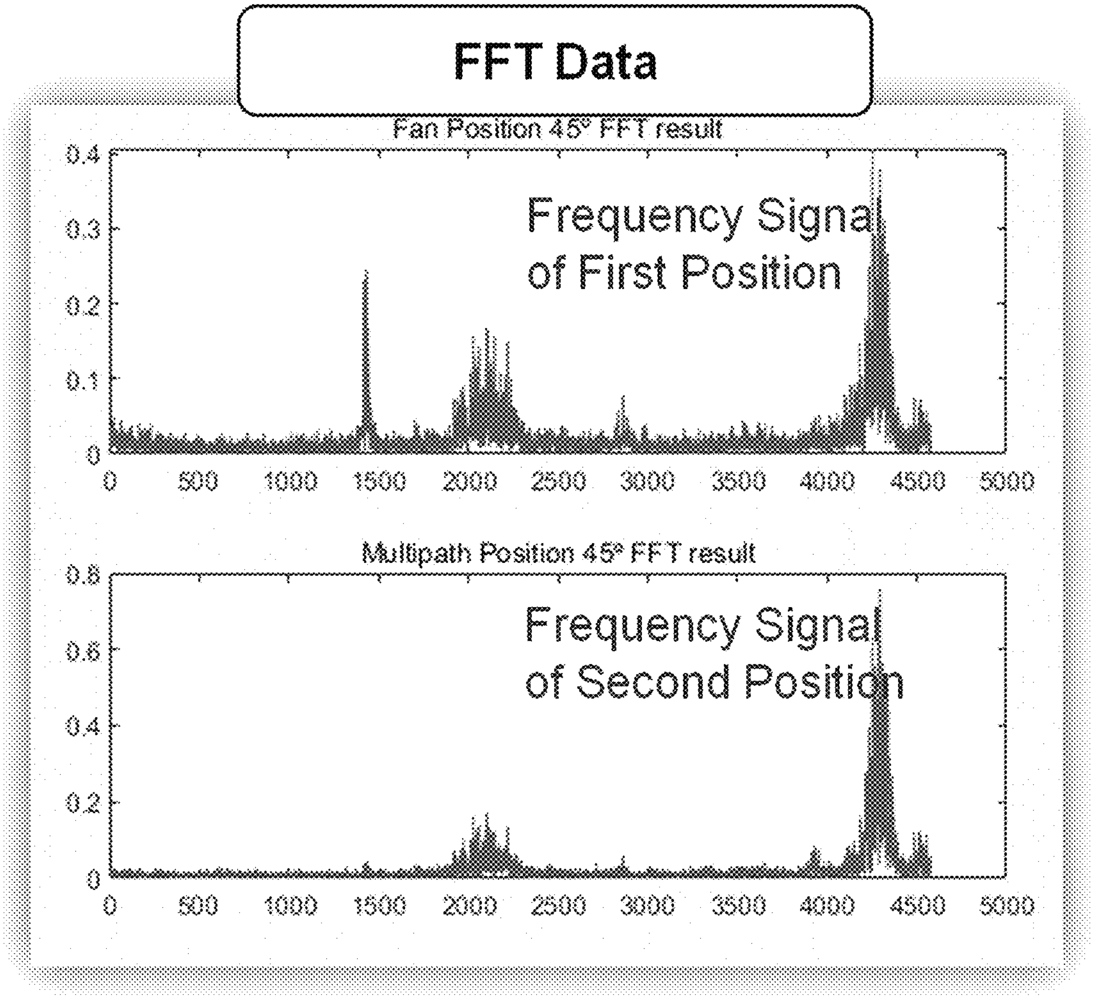
FIG. 6 shows an FFT signal graph for a first position and an FFT signal graph for a second position when a radar and a fan are disposed in a direction of 45 degrees.

FIG. 6 shows an FFT signal graph for a first position and an FFT signal graph for a second position when a radar and a fan are disposed in a direction of 45 degrees.

Referring to FIG. 6, it can be seen that, when being arranged in the direction of 45 degrees, three peaks are detected at the first position. It can be seen that the third peak, the peak between 4300 Hz and 4500 Hz, has the largest value, and it is difficult to determine which peak is a fundamental component and which peak is a harmonic component using only the FFT signal at the first position.

Referring to FIG. 6, it can be seen that two peaks are detected, a first peak is detected at 2000 Hz to 2300 Hz, and a second peak is detected at 4300 Hz to 4500 Hz. Even in the second position, it is difficult to clearly distinguish the fundamental component from the harmonic component because the higher frequency component has a larger magnitude.

As confirmed through FIGS. 5 and 6, the component of the signal reflected through the fan is irregular, and there is an aspect that it is difficult to specify the fundamental component. For this reason, in the present disclosure, FFT signals are acquired at each of the two positions.

The subtraction unit 230 functions to subtract the first FFT signal at the first position and the second FFT signal at the second position. The subtraction of the first FFT signal and the second FFT signal is made to specify the exact position of the fan.

Figure 7:
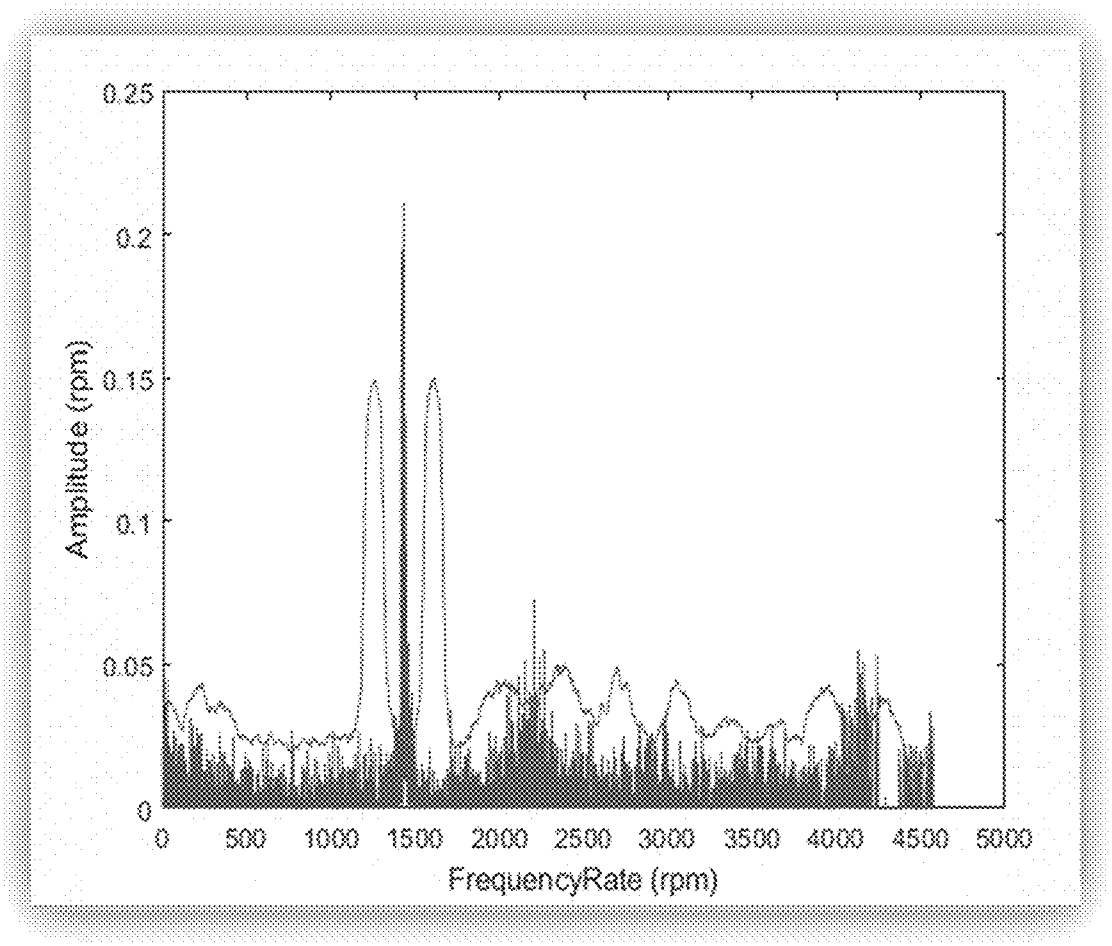
FIG. 7 shows a result of subtracting a first FFT signal for a first position and a second FFT signal for a second position when a radar and a fan are disposed in a direction of 90 degrees.

FIG. 7 shows a result of subtracting a first FFT signal for a first position and a second FFT signal for a second position when a radar and a fan are disposed in a direction of 90 degrees.

Referring to FIG. 7, it can be seen that the peak value of the high frequency component among the two peaks of the first FFT signal is significantly suppressed through subtraction of the first FFT signal and the second FFT signal.

Referring to FIG. 7, it can be seen that, when subtracting the second FFT signal from the first FFT signal, the fundamental component and the harmonic component of the peak value become more clear.

It can be seen that the peak value formed in the 1000 to 1200 Hz band has the largest value, and the peaks formed in other bands have relatively small values.

Figure 8:
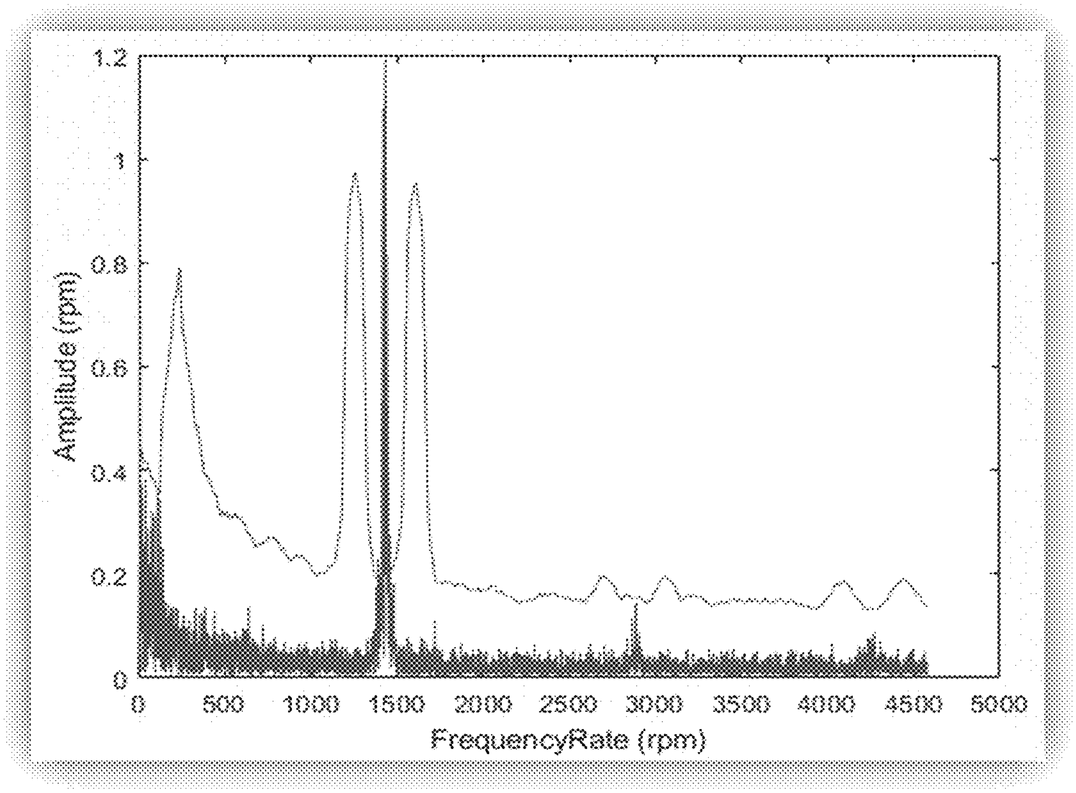
FIG. 8 shows a result of subtracting a first FFT signal for a first position and a second FFT signal for a second position when a radar and a fan are disposed in a direction of 45 degrees.

FIG. 8 shows a result of subtracting a first FFT signal for a first position and a second FFT signal for a second position when a radar and a fan are disposed in a direction of 45 degrees.

Referring to FIG. 8, it can be seen that peak values of high frequency components among three peaks of the first FFT signal are suppressed through subtraction of the first FFT signal and the second FFT signal.

When the radar and the fan are disposed in a direction of 45 degrees, there was an aspect that it was difficult to determine which component was the fundamental component and which component was the harmonic component in the first FFT signal at the first position.

However, it can be seen that the fundamental component becomes clear by subtracting the first FFT signal and the second FFT signal.

As a result, by subtracting the second FFT signal from the first FFT signal, the position of the fan can be clearly identified, and a clear fundamental component can be identified.

The RPM acquisition unit 240 acquires RO\PM of the fan using a signal in which the second FFT signal is subtracted from the first FFT signal. The RPM acquisition unit determines a frequency corresponding to the lowest peak value among peak values of the subtracted signal as the RPM of the fan.

Figure 9:
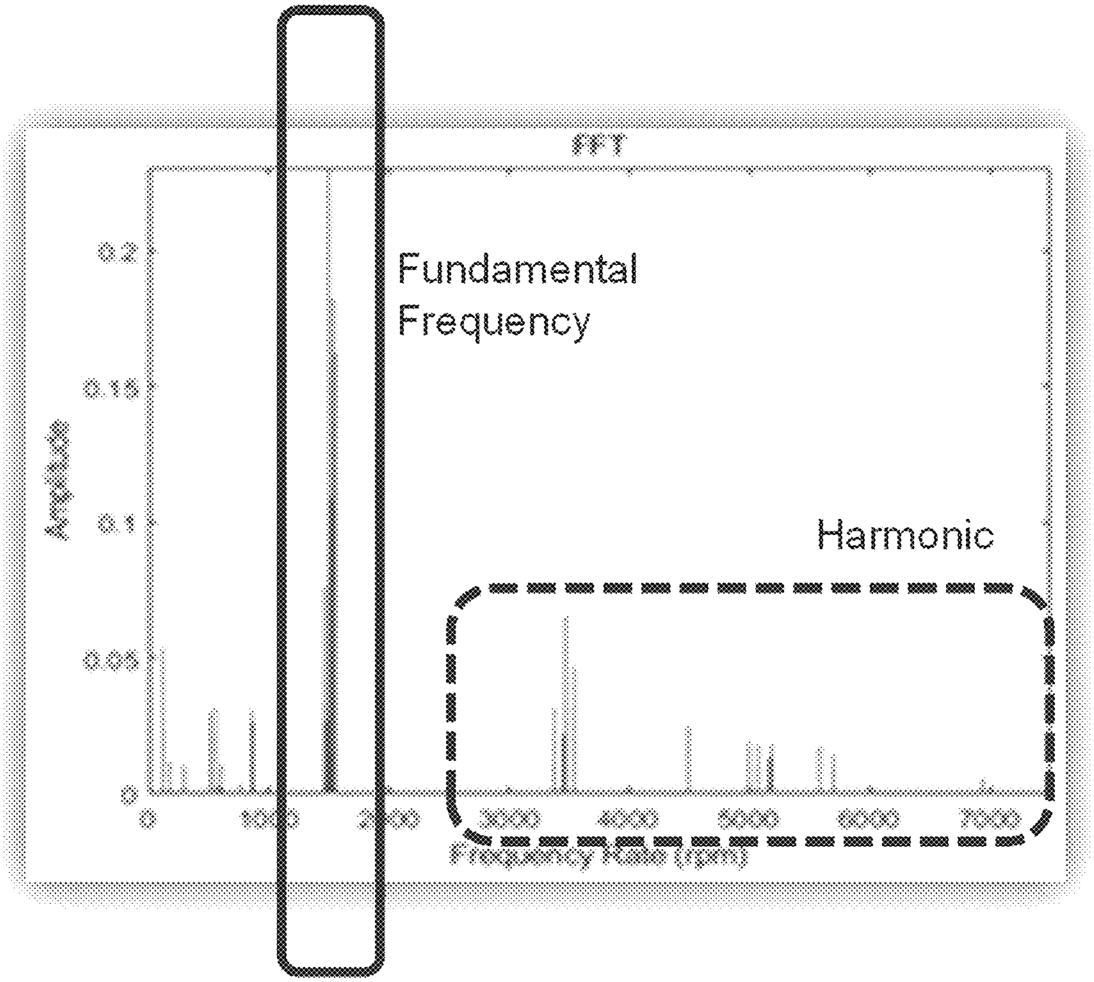
FIG. 9 shows an example of determining the RPM of a fan according to an embodiment of the present disclosure.

FIG. 9 shows an example of determining the RPM of a fan according to an embodiment of the present disclosure.

The graph shown in FIG. 9 is a graph of a signal in which the second FFT signal is subtracted from the first FFT signal. Among a plurality of peak values, the peak value of the lowest frequency corresponding to the fundamental component is identified, the frequency of the corresponding peak value is determined as RPM, and the remaining peak values are regarded as harmonic components.

It will be apparent to those skilled in the art that the adaptive boundary value can also be used for peak value detection.

Figure 10:
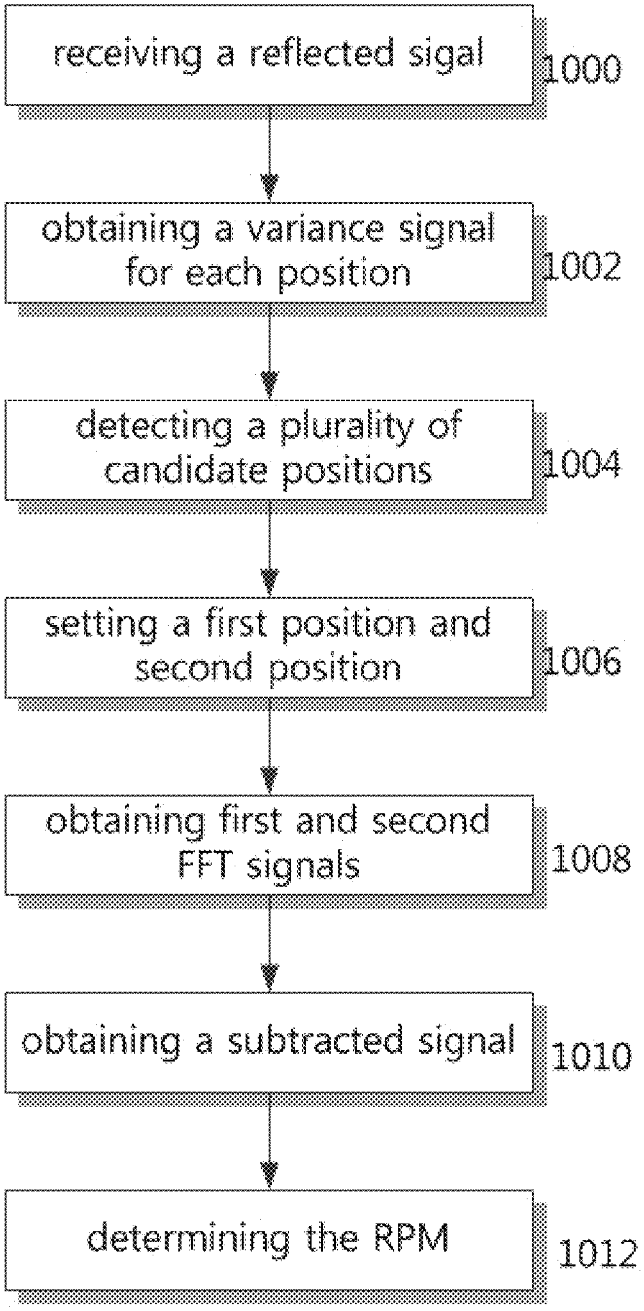
FIG. 10 shows a flowchart illustrating the overall flow of a method for measuring the RPM of a fan by using an IR-UWB radar according to an embodiment of the present disclosure.

FIG. 10 shows a flowchart illustrating the overall flow of a method for measuring the RPM of a fan by using an IR-UWB radar according to an embodiment of the present disclosure.

Referring to FIG. 10, first, a reflected signal for a radiation pulse of an IR-UWB radar is received (step 1000).

A variance signal for each position is obtained from the received reflected signal (step 1002).

Once the variance signal for each position is obtained, a plurality of candidate positions are detected by applying an adaptive boundary value (step 1004). Positions equal to or greater than the adaptive boundary value are set as candidate positions.

Among the plurality of detected candidate positions, the closest position is set as the first position, and the furthest position is set as the second position (step 1006).

Once the first position and the second position are set, an FFT calculation is performed on the signal for each position to obtain a first FFT signal from the first position signal and to obtain a second FFT signal from the second position signal (step 1008).

Once the first FFT signal and the second FFT signal are obtained, the second FFT signal is subtracted from the first FFT signal (step 1010).

A peak value corresponding to the lowest frequency is detected from the subtracted signal, and the frequency corresponding to the detected peak value is determined as the RPM of the fan (step 1012).

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

The invention claimed is:

1. A method for dynamically adjusting radar signal processing to accurately measure revolutions per minute (RPM) of a fan in a multipath environment using an impulse radio ultra-wideband (IR-UWB) radar, the method being performed by a computing device including a processor and a memory, the method comprising:

transmitting ultra-wideband radar signals by the IR-UWB radar to the fan, receiving reflected signals of the IR-UWB radar resulting from reflection of the transmitted ultra-wideband radar signals from the fan, processing the reflected signals by the processor to acquire a variance of the reflected signals at each of a plurality of positions, the variance representing a change in amplitudes of the reflected signals classified at each position which corresponds to an arrival time duration of each reflected signal;

determining candidate positions having a variance equal to or greater than a position-specific predetermined boundary value that is adaptively updated based on local noise power around each specific position among the variance of the reflected signals;

selecting, from among the candidate positions, the closest position to the IR-UWB radar as a first position and a furthest position from the IR-UWB radar as a second position;

performing a first fast Fourier transform (FFT) calculation on the reflected signals of the IR-UWB radar corresponding to the first position to acquire a first FFT signal, and performing a second FFT calculation on the reflected signals of the IR-UWB radar corresponding to the second position to acquire a second FFT signal;

reducing environmental effects in the first FFT signal by subtracting the second FFT signal from the first FFT signal to obtain a filtered subtracted signal; and determining the RPM of the fan by using the subtracted signal.

2. The method of claim 1, wherein the determining of the RPM of the fan includes detecting peak values of the subtracted signal and identifying a frequency of a fundamental peak value as the RPM of the fan.

3. An apparatus for dynamically adjusting radar signal processing to accurately measure revolutions per minute (RPM) of a fan in a multipath environment using an impulse radio ultra-wideband (IR-UWB) radar, the apparatus comprising:

a processor; and a memory electrically coupled to the processor, wherein the processor is configured to:

receive reflected signals of the IR-UWB radar to acquire a variance of the reflected signals at each of a plurality of positions, the variance representing a change in amplitudes of the reflected signals classified at each position which corresponds to an arrival time duration of each reflected signal;

determine candidate positions having a variance equal to or greater than a position-specific predetermined boundary value that is adaptively updated based on local noise power around each specific position among the variance of the reflected signals;

select, from among the candidate positions, the closest position to the IR-UWB radar as a first position, and a furthest position from the IR-UWB radar as a second position;

perform a first fast Fourier transform (FFT) calculation on the reflected signals of the IR-UWB radar corresponding to the first position to acquire a first FFT signal, and perform a second FFT calculation on the reflected signals of the IR-UWB radar corresponding to the second position to acquire a second FFT signal;

reduce environmental effects by subtracting the second FFT signal from the first FFT signal to obtain a filtered subtracted signal;

and determine the RPM of the fan by using the subtracted signal.

* * * * *